United States Patent
Ray, Jr.

(10) Patent No.: US 12,349,638 B2
(45) Date of Patent: Jul. 8, 2025

(54) APPARATUS AND METHODS FOR A HYDROPONICS SYSTEM WITH LIGHT CONTROL

(71) Applicant: James S. Ray, Jr., Raleigh, NC (US)

(72) Inventor: James S. Ray, Jr., Raleigh, NC (US)

(73) Assignee: James S. Ray, Jr., Raleigh, NC (US)

( * ) Notice: Subject to any disclaimer, the term of this patent is extended or adjusted under 35 U.S.C. 154(b) by 117 days.

(21) Appl. No.: 18/295,261

(22) Filed: Apr. 3, 2023

(65) Prior Publication Data

US 2023/0232750 A1    Jul. 27, 2023

Related U.S. Application Data

(63) Continuation-in-part of application No. 16/186,447, filed on Nov. 9, 2018, now Pat. No. 11,617,316.

(60) Provisional application No. 62/584,568, filed on Nov. 10, 2017.

(51) Int. Cl.
| | |
|---|---|
| A01G 7/04 | (2006.01) |
| A01G 31/06 | (2006.01) |
| H05B 45/12 | (2020.01) |
| H05B 45/22 | (2020.01) |
| H05B 47/155 | (2020.01) |

(52) U.S. Cl.
CPC ............ *A01G 7/045* (2013.01); *A01G 31/06* (2013.01); *H05B 45/12* (2020.01); *H05B 45/22* (2020.01); *H05B 47/155* (2020.01)

(58) Field of Classification Search
CPC ...... A01G 7/045; A01G 31/06; H05B 47/155; H05B 45/12; H05B 45/22
See application file for complete search history.

(56) References Cited

U.S. PATENT DOCUMENTS

| | | | |
|---|---|---|---|
| 2,896,374 | A | 7/1959 | Perin |
| 2,940,218 | A | 6/1960 | Carter |
| 2,952,096 | A | 9/1960 | Hughes et al. |
| 3,314,192 | A | 4/1967 | Park |
| 3,606,697 | A | 9/1971 | Eden |
| 4,051,626 | A | 10/1977 | Trumley et al. |
| 4,170,844 | A | 10/1979 | Watanabe et al. |
| 4,276,720 | A | 7/1981 | Lyon |
| 4,514,929 | A | 5/1985 | Lestraden |

(Continued)

FOREIGN PATENT DOCUMENTS

| | | | | |
|---|---|---|---|---|
| EP | 2457437 A2 | * | 5/2012 | ........... A01G 9/1407 |
| EP | 3903570 A1 | * | 11/2021 | ............. A01G 9/243 |

(Continued)

OTHER PUBLICATIONS

International Search Report and Written Opinion dated Feb. 7, 2019, regarding PCT/US2018/60224.

*Primary Examiner* — Ebony E Evans
(74) *Attorney, Agent, or Firm* — PROCOPIO, CORY, HARGREAVES & SAVITCH LLP

(57) ABSTRACT

A hydroponics lighting system includes a plurality of hydroponics pans. The system includes multiple light sources, each of the multiple light sources being attached to the exterior surface of at least one of the plurality of hydroponics pans and individual light sources emitting different wavelengths of light and a controller configured to individually adjust one or more of light intensity or wavelength output for each of the multiple light sources over time.

20 Claims, 14 Drawing Sheets

(56) References Cited

U.S. PATENT DOCUMENTS

| | | | |
|---|---|---|---|
| 4,914,858 A * | 4/1990 | Nijssen | A01G 7/045 47/60 |
| 5,009,029 A | 4/1991 | Wittlin | |
| 5,042,196 A | 8/1991 | Lukawski | |
| 5,323,567 A | 6/1994 | Nakayama et al. | |
| 6,061,957 A | 5/2000 | Takashima | |
| 6,105,309 A | 8/2000 | Takayanagi | |
| 6,359,392 B1 | 3/2002 | He | |
| 9,107,256 B2 | 8/2015 | Kang et al. | |
| 9,185,852 B2 * | 11/2015 | Aikala | H01L 33/504 |
| 9,547,319 B2 | 1/2017 | Zulim et al. | |
| 9,642,209 B2 | 5/2017 | Eisele et al. | |
| 9,775,330 B1 | 10/2017 | Chen | |
| 9,901,045 B2 | 2/2018 | Miyabe et al. | |
| 9,974,252 B2 * | 5/2018 | Aykroyd | A01G 9/246 |
| 10,624,275 B1 | 4/2020 | Lewis | |
| 10,638,678 B2 | 5/2020 | Collier et al. | |
| 2010/0020536 A1 * | 1/2010 | Bafetti | F21V 29/502 362/231 |
| 2012/0279127 A1 | 11/2012 | Yusibov et al. | |
| 2013/0102076 A1 | 4/2013 | Licamele et al. | |
| 2014/0017043 A1 | 1/2014 | Hirai | |
| 2014/0115958 A1 | 5/2014 | Helene et al. | |
| 2014/0259920 A1 | 9/2014 | Wilson | |
| 2014/0366443 A1 | 12/2014 | Brusatore | |
| 2015/0305108 A1 | 10/2015 | Probasco | |
| 2015/0342133 A1 | 12/2015 | Nakjima et al. | |
| 2016/0295820 A1 | 10/2016 | Aykroyd et al. | |
| 2016/0360712 A1 | 12/2016 | Yorio et al. | |
| 2017/0079223 A1 | 3/2017 | Cheng et al. | |
| 2017/0181393 A1 | 6/2017 | Nelson | |
| 2017/0264236 A1 | 9/2017 | Liu | |
| 2018/0054986 A1 | 3/2018 | Fu et al. | |
| 2018/0352755 A1 | 12/2018 | Szoradi et al. | |
| 2019/0021249 A1 | 1/2019 | Ivanescu et al. | |
| 2019/0082613 A1 | 3/2019 | Eisele | |
| 2019/0110407 A1 | 4/2019 | Su et al. | |
| 2019/0259108 A1 | 8/2019 | Bongartz et al. | |
| 2020/0184153 A1 | 6/2020 | Bongartz et al. | |
| 2020/0253133 A1 | 8/2020 | Lewis | |

FOREIGN PATENT DOCUMENTS

| | | |
|---|---|---|
| JP | 2007159410 A | 6/2007 |
| JP | 2016036312 A | 3/2016 |
| KR | 101279050 B1 | 7/2013 |
| WO | 0203777 A1 | 1/2002 |
| WO | 2013082601 A1 | 6/2013 |
| WO | 2016175021 A1 | 11/2016 |

* cited by examiner

APPARATUS AND METHODS FOR A HYDROPONICS SYSTEM WITH LIGHT CONTROL

CROSS-REFERENCE TO RELATED APPLICATION

This application is a Continuation-in-Part of U.S. Nonprovisional application Ser. No. 16/186,447, filed Nov. 9, 2018, entitled "APPARATUS AND METHODS FOR A HYDROPONICS SYSTEM WITH ENHANCED HEAT TRANSFER", which claims the benefit under 35 U.S.C. § 119(e) of U.S. Provisional Application No. 62/584,568, filed Nov. 10, 2017, entitled "APPARATUS AND METHODS FOR A HYDROPONICS SYSTEM WITH INTEGRATED GROW LIGHTS," the entirety of which are hereby incorporated by their reference.

INTRODUCTION

The present disclosure relates generally to hydroponics systems, and more specifically to hydroponics systems using light emitting diodes (LEDs) and pumps.

Hydroponics pertains to growing plants in a water based, nutrient rich solution without soil. Hydroponic techniques may be used for growing both foods and medicinal plants. In some hydroponic systems plants are grown with their roots exposed to mineral solutions. In other systems the roots may be supported by gravel or a similar inert medium. Nutrients may be derived from organic byproducts, e.g., manure, dead fish, etc.

Grow lights and/or horticulture lighting systems may be used for providing light to growing plants. Lighting technologies for grow lights may be based on any of fluorescent lighting, light emitting diodes (LEDs), metal halide lighting, high pressure sodium lighting, etc. One measure of light for assessing a horticulture light system is photosynthetic active radiation (PAR). PAR light corresponds to wavelengths within the visible range of 400 to 700 nanometers (nm), e.g., that may be useful for photosynthesis.

SUMMARY

Several aspects of hydroponic systems will be described more fully hereinafter with reference to hydroponic pans arranged for a series flow pattern.

In one aspect, a hydroponics lighting system includes a plurality of hydroponics pans. The system includes multiple light sources, each of the multiple light sources being attached to the exterior surface of at least one of the plurality of hydroponics pans and individual light sources emitting different wavelengths of light and a controller configured to individually adjust one or more of light intensity or wavelength output for each of the multiple light sources over time In one aspect a hydroponics system comprises a plurality of hydroponics pans, a pump, and a light source. The plurality of hydroponics pans comprises a first hydroponics pan and a second hydroponics pan. The first hydroponics pan is configured to receive a grow solution via a first tube and to transport the grow solution to a second tube. The second hydroponics pan is configured to receive the grow solution via the second tube and to transport the grow solution to a third tube. The pump is configured to pump the grow solution to the first hydroponics pan via the first tube. The light source is thermally attached to at least one of the plurality of hydroponics pans; the at least one of the plurality of hydroponics pans is configured to conduct heat from the light source to the grow solution.

In another aspect a method of operating a hydroponics system comprises: pumping a grow solution; circulating the grow solution in a first hydroponics pan; conducting heat from a first light emitting diode (LED); draining the grow solution via a first tube; circulating the grow solution in a second hydroponics pan; and draining the grow solution to the pump via a second tube. The grow solution is pumped to the first hydroponics pan from a pump. The grow solution is circulated in the first hydroponics pan to the first tube. The grow solution is drained via the first tube. The grow solution is circulated in the second hydroponics pan to the second tube.

In another aspect a hydroponics system comprises a plurality of hydroponics pans, a pump, and a light source. The plurality of hydroponics pans are arranged in an array and comprise a top pan and a bottom pan. The pump is connected to an outflow tube. The outflow tube is configured to provide a water supply to the top pan; and the pump is configured to receive the water supply from the bottom pan. The light source is in thermal contact with at least one of the plurality of hydroponics pans. The at least one of the plurality of hydroponics pans is configured to transfer heat from the light source to the water supply. The at least one of the plurality of hydroponics pans is configured to receive the water supply from a first tube, to circulate the water supply, and to drain the water supply via a second tube separated from the first tube.

It will be understood that other aspects of hydroponic systems will become readily apparent to those skilled in the art from the following detailed description, wherein it is shown and described only several embodiments by way of illustration. As will be appreciated by those skilled in the art, the hydroponic systems can be realized with other embodiments without departing from the invention. Accordingly, the drawings and detailed description are to be regarded as illustrative in nature and not as restrictive.

BRIEF DESCRIPTION OF THE DRAWINGS

Various aspects of apparatus and methods for a hydroponics system with enhanced heat transfer will now be presented in the detailed description by way of example, and not by way of limitation, in the accompanying drawings, wherein.

DETAILED DESCRIPTION

Figure 1A:
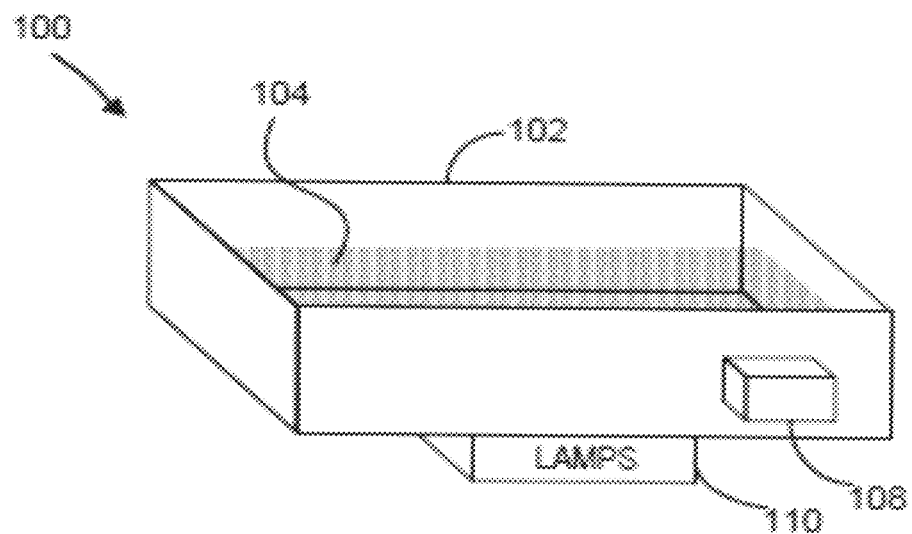
FIG. 1A illustrates a side perspective view of a light source in thermal contact with a hydroponics pan.

The detailed description set forth below in connection with the drawings is intended to provide a description of example aspects of hydroponics systems with integrated grow lights, and it is not intended to represent the only embodiments in which the invention may be practiced. The term "example" used throughout this disclosure means "serving as an example, instance, or illustration," and should not necessarily be construed as preferred or advantageous over other aspects presented in this disclosure. The detailed description includes specific details for the purpose of providing a thorough and complete disclosure that fully conveys the scope of the invention to those skilled in the art. However, the invention may be practiced without these specific details. In some instances, well-known structures and components may be shown in block diagram form, or omitted entirely, in order to avoid obscuring the various concepts presented throughout this disclosure.

Hydroponics and hydroponic systems can be used indoors with a horticulture lighting system to grow a variety of plants, e.g., including vegetables, tomatoes, fruit, flowers, etc. This variety may be referred to herein as cultivars. Horticulture lighting systems can include grow lamps, ballasts, and lamp drivers. For instance, grow lamps can be provided in the form of light emitting diodes (LEDs) which can be controlled using LED drivers. LED drivers can control LED current by using pulse width modulation (PWM) and/or by controlling resistance via a potentiometer.

In a hydroponics system and in an indoors hydroponics system, it can be important to control the temperature of the hydroponics environment. As grow lamps, LEDs, and components of a horticulture lighting system emit heat, they require additional external, and sometimes costly, heat sinks and fans. The heat may need to be vented away from the hydroponics environment to prevent the environment temperature, e.g., the room temperature of the surrounding room, from increasing uncontrollably. This may require additional Heating, Ventilation, and Air Conditioning (HVAC) to be installed to control the room temperature. Such requirements for HVAC systems may reduce the amounts of surface area available to grow cultivars. However, this process of using additional components to remove heat from the lighting system (i.e., horticulture lighting system) requires additional space and components. Such added space requirements and/or components may be space consuming, costly and/or add an undesirable amount of complexity to the manufacturing process. Accordingly, there is a need for a hydroponics system which reduces or eliminates the need for additional heat removal components. Aspects presented herein not only reduce the need for additional heat removal components but also enable the emitted heat from the lighting system to be recycled. Thus, aspects provide more efficient energy use.

Apparatus and methods for a hydroponics system with enhanced heat transfer are presented herein. By arranging the flow hydroponics system to have a series flow pattern, e.g., via drains and/or tubes, along a set of hydroponic pans, heat may be transferred from heat producing elements. The heat producing elements, including light emitting diodes (LEDs), may be thermally attached to the hydroponic pans. The hydroponics pans may comprise a material that is conductive to heat, e.g., as opposed to a plastic. For example, the hydroponics pan may comprise a metal that has a good heat conducting property. As one example, the pan may comprise steel. As another example, the pan may comprise aluminum. In one example, a thermal adhesive, e.g., 113, may be placed between the light source 111 and the pan 102 and/or between the driver 108 and the pan 102. The thermal adhesive may provide at least part of the coupling of the light source to the pan and may further improve the transfer of heat from the light source to the body of the hydroponics pan. The thermal adhesive may comprise a thermal paste, a thermal epoxy, a thermal grease, etc. The thermal adhesive may be used, e.g., with a light source comprising an LED array. Other fasteners may also be used to secure the light source and/or wiring to the hydroponics pan. For example, aluminum tape may be used to help secure the light source and/or wires to the hydroponics pan. In other examples, such as with a ceramic light source, a metal halide light sources, or a sodium light source, the thermal contact may be achieved without a thermal adhesive. The thermal contact may be achieved simply by physical contact between the light source and the body of the pan. Thus, the heat from the lights of the hydroponics system may be transferred to the pans themselves. The heat can be recycled by being transferred using a series circulating water supply for providing nutrient rich minerals at the roots of plants. The water may absorb heat from the pans and help to transfer and/or dissipate the heat throughout the hydroponics system and the water circulates through the hydroponics system. Thus, the heat can be transferred via the pans and/or water circulation without the need for costly fans or specialized heat sinks. By removing the need for additional heat dissipation components, more space can be availed for the production of plants while also recycling energy in the form of transferred heat.

FIG. 1A illustrates a side perspective view 100 of a light source 110 in thermal contact with a hydroponics pan 102. Also, as illustrated, an element 108 may also be in thermal contact with hydroponics pan 102, e.g., on a side opposite a side configured to hold plants, fluid, etc. The light source 110 may be realized with lamps and/or light emitting diodes (LEDs) for providing photosynthetic active radiation (PAR) light conducive to horticulture. In some aspects element 108 may include a lamp driver to provide power to the light source 110. For instance, element 108 may include an LED driver. Thus, element 108 may be coupled to light source 110.

The hydroponics pan 102 can contain a solution 104 (i.e., grow solution), the solution 104 can be water and/or a nutrient rich solution for plant roots. Having the light source 110 and element 108 in thermal contact with the hydroponics pan 102 can advantageously allow for dissipated heat from the light source 110 and/or element 108 to be transferred to the solution 104 via the contact of the light source 110/element 108 with the pan 102 and the contact of the grow solution 104 with the pan. For example, heat from the light source 110 may be transferred at the surface of a heat conductive hydroponics pan 102 into the solution 104, by virtue of the surface contact between the light and the pan. In this way thermal energy from the light source 110 and/or element 108 can be transferred as useful energy to the solution 104 without the need for large, costly heat sinks and/or fans. When used for plants, the solution may continue to make thermal contact with the body of the pan, enabling the solution to absorb heat from the pan body, as the pan body absorbs heat due to the thermal contact with the lights.

Although FIG. 1A shows a single element 108 and a single light source 110 as being connected to the hydroponics pan 102, the example is merely illustrative of the principle. Multiple light sources 110 and/or multiple driver elements 108 may be coupled to a hydroponics pan. In some aspects, the solution 104 may comprise water for growing microgreens.

Figure 1B:
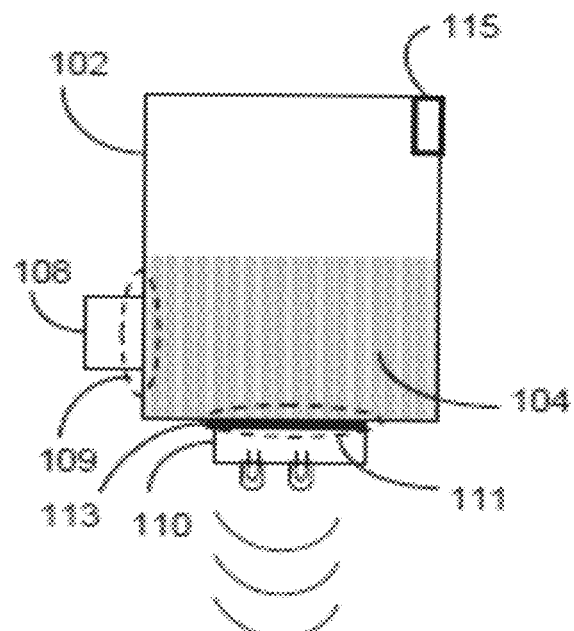
FIG. 1B illustrates a system block diagram of the light source in thermal contact with the hydroponics pan.

FIG. 1B illustrates a system block diagram of the light source 110 in thermal contact with a heat conductive hydroponics pan 102. The light source 110 is coupled to, connected to, or fastened to the pan 102 to form thermal contact between the pan and the light source. The light source 110 is positioned to form an interface 111 with the pan 102. Element 108 may similarly be coupled to, connected to, or fastened to the pan 102 to form an interface 109 with the pan 102. The interface 111 enables heat to be conducted from the light source 110 via the interface 111 into the solution 104; and heat can conduct from the element 108 via the interface 109 into the solution 104. The hydroponics pan 102 can be made of materials such as metal which have a high or substantially high thermal conductivity. A light source may require a light source case temperature to remain below a certain temperature in order to operate at a particular level, e.g., a temperature below 25° to operate at a higher, 2.1 A drive current. At higher temperatures, the light source may need to operate at a lower drive current. A high thermal conductivity can advantageously enhance the conduction of heat from the light source 110. The present application helps to maintain the case of the light source and corresponding semiconductor at the same temperature of the hydroponics pan that may be controlled by thermostat inside house. This enables the lights to operate at a higher drive current. Therefore, fewer light sources may be needed to achieve the same result in growing cultivars. This can reduce the cost of the hydroponics system.

Figure 2:
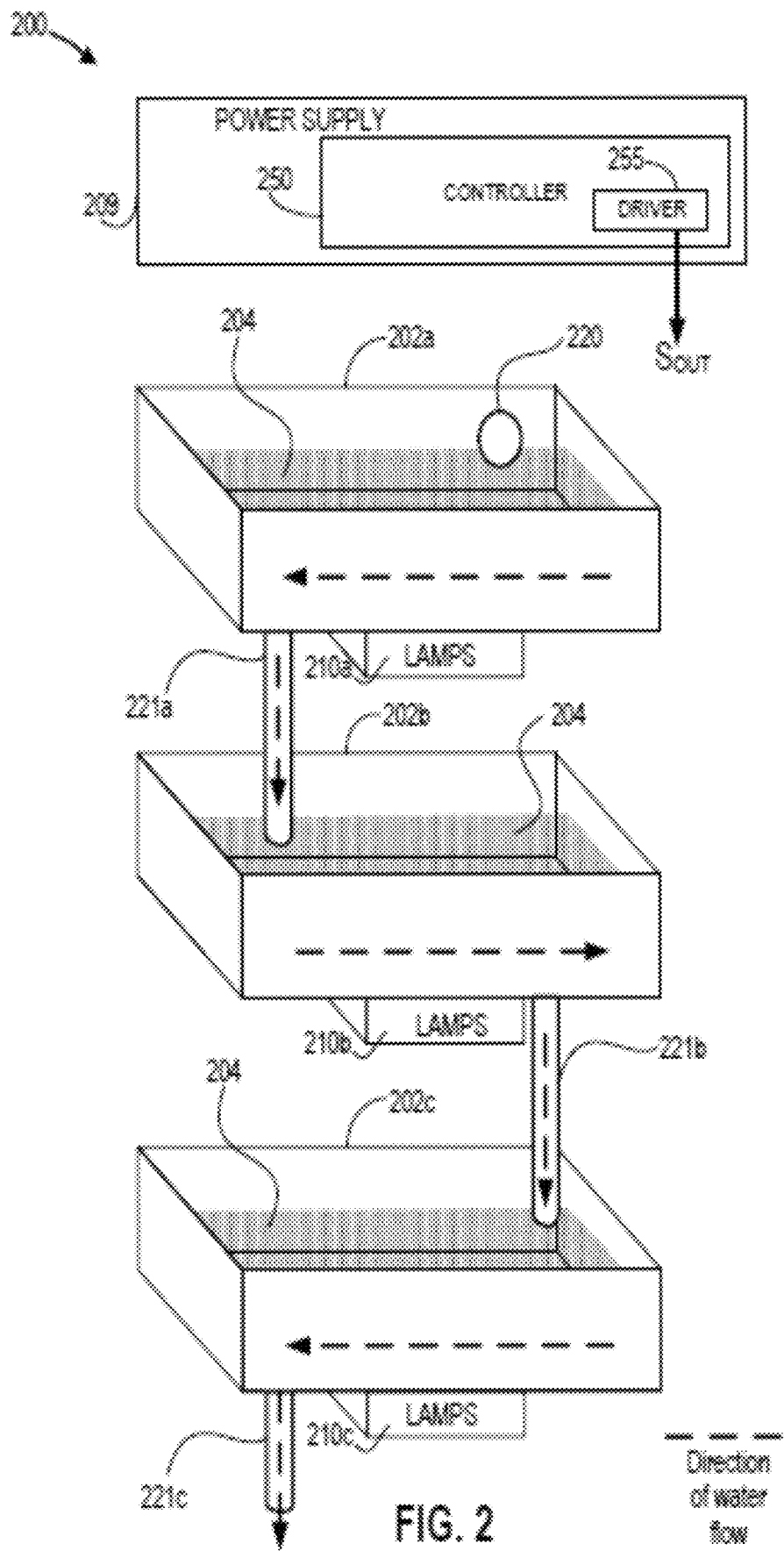
FIG. 2 illustrates a hydroponics system according to the teachings herein.

FIG. 2 illustrates a hydroponics system 200 according to the teachings herein. The hydroponics system 200 may include a power supply 209, hydroponics pans 202a-c, light sources 210a-c, and connecting component 221a-c, e.g., tubes. As illustrated, the hydroponics pans 202a-c may be assembled to form an array with hydroponics pan 202a arranged as the top pan and the other hydroponics pans positioned under hydroponics pan 202a. The hydroponics pans 202a-c may be configured to receive and circulate solution 204 (e.g., a grow solution) for growing plants and/or microgreens; and the solution 204 may comprise water. For example, FIG. 2 illustrates the pans 202a-c as rectangular structures having four sides, a bottom, and an open top. Other shapes and dimensions can be used with the concepts presented herein. For example, the pans may be rounded or have a non-rectangular shape. For example, the pans may have a triangular, octagonal, hexagonal, etc. shaped bottom. The pans may have an asymmetric shape, e.g., to fit an opening in a particular room. The pans may comprise a container having a bottom and walls configured to hold a fluid and an opening to enable plants within the container to receive light from a lamp 210a-c. Additionally, the pans may be configured to form thermal contact with at least one. FIG. 2 illustrates light sources 210a-c may be in thermal contact with hydroponics pans 202a-c, respectively.

As shown in FIG. 2, the light source 210a can be positioned underneath the hydroponics pan 202a so that light and/or PAR light from the light source 210a can illuminate onto hydroponics pan 202b. By similar arrangement, PAR light from the light source 210b can illuminate onto the hydroponics pan 202c.

The power supply 209 may include a controller 250, and the controller may include a driver 255. The power supply may receive alternating current (ac) power and/or direct current (dc) power which may be converted to voltage levels (e.g., lower voltages) for driving electrical components of the hydroponics system 200. For instance, the power supply 209 can receive standard one-hundred and twenty volt ac power and convert it to a lower dc voltage for supplying power to the controller 250. The controller 250 may, in turn, receive signals (e.g., hydroponics system variables) indicative of the hydroponics system environment (e.g., a temperature of the solution 204). At least one sensor 115 may be coupled to a hydroponics pan and may provide a reading to the controller 250. The sensor may measure any of various parameters, e.g., any combination of light, temperature, humidity, pH, Electrical Conductivity (EC), light intensity, light intensity per a specific frequency, video, infrared video, and non-infrared video, etc. The controller may automatically adjust parameters of the hydroponics system, e.g., controlling light intensity, air flow, fluid circulation, etc. in response to receiving a measurement outside of a preferred range. The preferred range may be specific to the particular cultivar being grown in the hydroponics pans. In response to receiving signals, the controller may provide a signal vector $S_{OUT}$ comprising one or more signals for regulating system parameters. For instance, the signal vector $S_{OUT}$, may be provided to the light sources 210a-c to control light intensity. In controlling light intensity, the controller 250 may use the driver 255 (e.g., an LED driver) to provide the signal vector $S_{OUT}$ as a drive current (e.g., an LED current) thereby adjusting light intensity (i.e., light intensity from light sources 210a-c). The controller may also enable a user to take manual measurements of light, temperature, pH, etc. and to manually adjust a light intensity of at least one light source. As one of ordinary skill in the art may appreciate, the power supply 209 may comprise greater or fewer components to provide power to and to regulate the hydroponics system 200.

The controller may individually measure parameters for different wavelengths of light and may individually control different light sources that emit different wavelengths of light. For example, at least one quantum light meter may measure light intensity at a plant canopy level for a specific wavelength. The intensity may be measured for a wavelength outside 400-700 nm in PAR, e.g., such as 285 nm UV-B that may boost cultivar yield 20%. The measurement may also capture light intensity for wavelengths above PAR, e.g. 760 nm that may also increase yield. The controller may then adjust individual light sources to form a desired combination of wavelengths, each at a desired level. The controller may comprise multiple circuits, each circuit configured to activate and/or adjust a particular wavelength of light. Thus, the controller may variably control the intensity of individual light sources. This enables control over the spectrum with respect to time and frequency/wavelength. Thus, the controller may be able to detect the intensity for each of the wavelengths used. As the canopy level measurement is performed by a quantum light meter, the controller may use the measurements to provide quantum generated photons from a semiconductor band gap for each individual LED wavelength forming a programmable system with sensor feedback to measure the actual light spectrum, compare the measured spectrum to a desired spectrum, and adjust the light wavelength and intensity using a Fourier transform algorithm. In some aspects, memory and a processor may use a Fast Fourier Transform (FFT) in a closed loop to program and maintain the spectrum of light colors across the life cycle of a given cultivar. As an example, a full spectrum network addressable custom printed circuit board (PCB) may be used.

Figure 8:
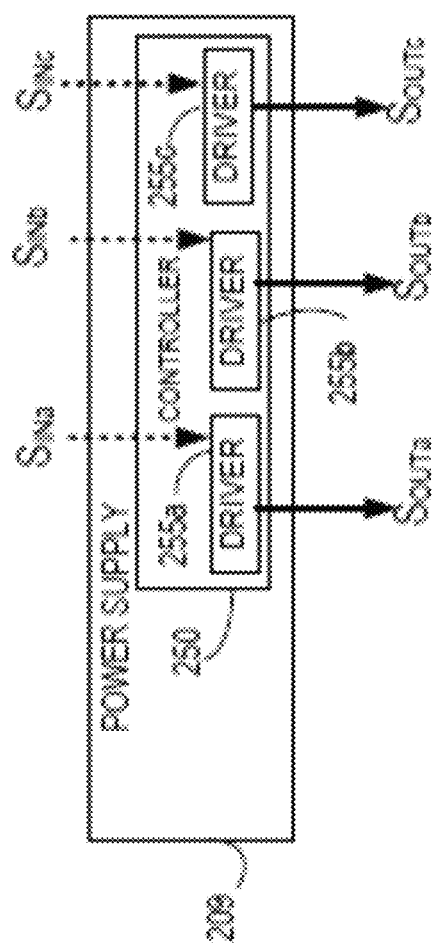
FIG. 8 illustrates example aspects of a controller for hydroponics systems according to the teachings herein.

A signal may then undergo digital signal processing using a digital signal processing algorithm at the controller to determine a desired signal, e.g., a desired combination of wavelengths of light. The determination of the desired combination may also involve a determination of a desired intensity of each of multiple individual wavelengths in the desired combination. FIG. 8 illustrates an example similar to FIG. 2, in which the controller (e.g., 250) comprises multiple drivers 255a, 255b, 255c, that each provide a signal to light sources having a different wavelength of light. The controller may output individual control signals $S_{OUTa}$, $S_{OUTb}$, $S_{OUTc}$, etc. for light sources of different colors of light. Similarly, the controller may receive individual measurement/control signals $S_{INa}$, $S_{INb}$, $S_{INc}$, etc. regarding the different light sources of different colors of light. While this figure illustrates 3 drivers, there may be more or less. For example, a control may comprise two drivers or may comprise 6 or more drivers. A look up table may be employed in the determination, e.g., for different cultivars. The controller may then give closed loop feedback to the constant current power supply for each of the individual wavelength of light. The following table provides examples of various ranges of wavelengths/frequency of light for different colors of light:

TABLE 1

Colors of Light Spectrum

| Color | Wavelength Interval | Frequency Interval |
|---|---|---|
| Far Red | 760 nm | |
| Red | 700-635 nm | 430-480 THz |
| Orange | 635-590 nm | 480-510 THz |
| Yellow | 590-560 nm | 510-540 THz |
| Green | 560-520 nm | 540-480 THz |
| Cyan | 520-490 nm | 580-610 THz |
| Blue | 490-450 nm | 610-670 THz |
| Violet | 450-400 nm | 670-750 THz |
| Ultraviolet | 285 nm | |

Figure 9:
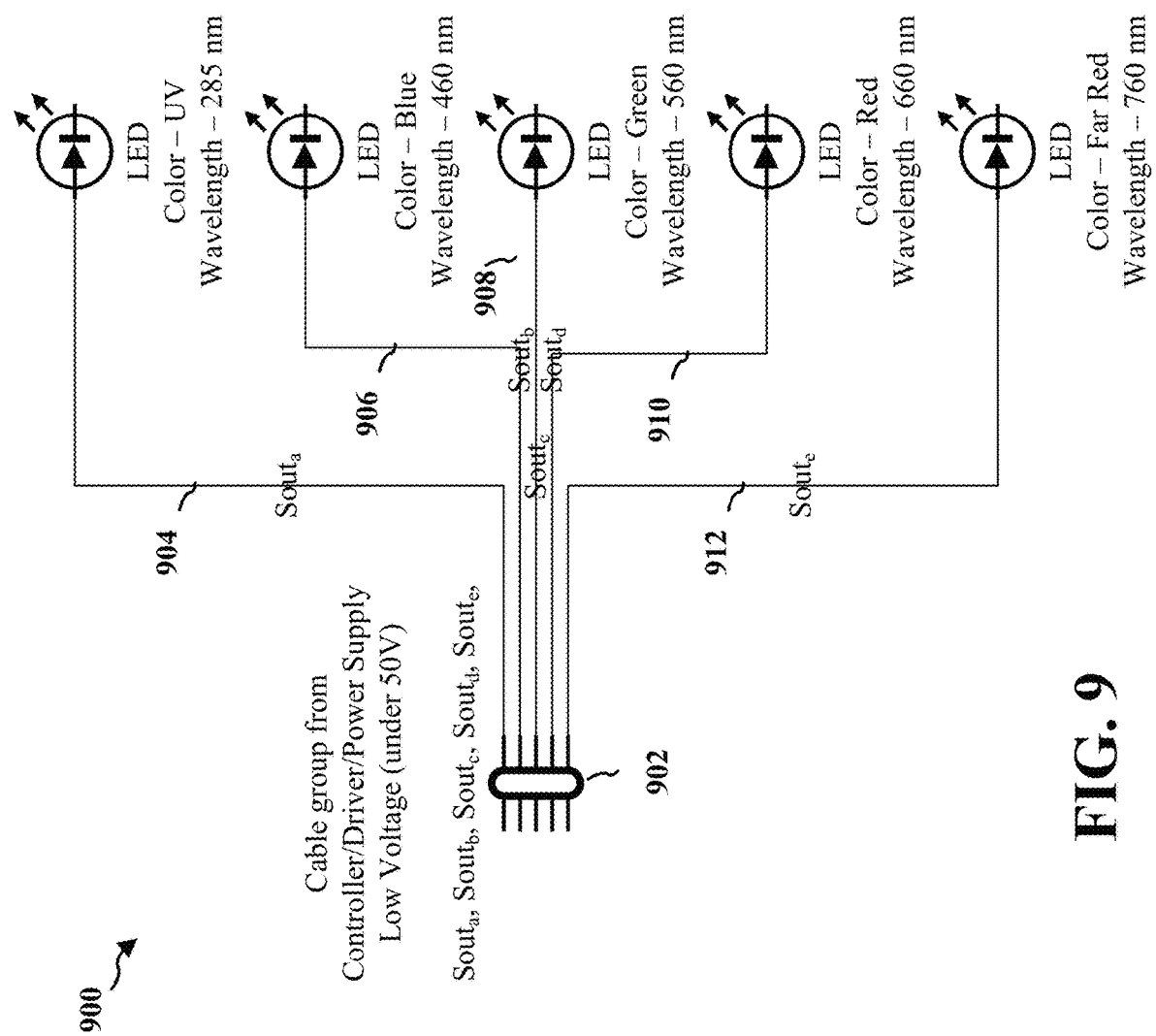
FIG. 9 illustrates an example of individual control of different wavelengths of light by a controller.

FIG. 9 illustrates a diagram 900 showing a controller with 5 signal outputs, e.g., $S_{OUTa}$ (e.g., via control line 904 from the controller 902), South (e.g., via control line 906 from the controller 902), $S_{OUTc}$ (e.g., via control line 908 from the controller 902), $S_{OUTd}$ (e.g., via control line 910 from the controller 902), $S_{OUTe}$ (e.g., via control line 912 from the controller 902), corresponding to UV wavelength (e.g., approximately 285 nm), blue wavelength (e.g., approximately 460 nm), green wavelength (e.g., approximately 560 nm), red wavelength (e.g., approximately 660 nm) and far red wavelength (e.g., approximately 760 nm, respectively. As described in connection with FIG. 8, each of the outputs may be controlled separately via the controller in order to provide a single color of light, e.g., which may change at different times of a cycle (e.g., over a day, a period of days, a grow cycle, etc.) or to provide a mixture of light colors. The mixture of light output by the controller may vary over time, e.g., over a day, a period of days, a grow cycle, etc.) or to provide a different mixture of light colors. The light sources may include different types of LED lights. For example, the total amount of light in a day may change for the plants. In a vegetation stage of a plant, the light may be provided for 18 hours. In a flowering stage, the light may be reduced to a cycle of for example 10 hours a day. In some aspects, the amount of ultraviolet light may be increased during a flowering stage to adjust a property of the plant.

Thus, a controller may control for white light with a single 100 W light source that is a monolithic array of blue 460 nm LEDs coated with phosphorus excited by the blue LEDs to produce white light and heat. As another example, the white light source may be replaced with light sources of individual colors, each having their own simple circuit design coupled to the current power supply, e.g., with a dimmer circuit. The dimmer circuit may enable control of the individual intensity of each color of light. Using Fourier analysis, any given amplitude of any given frequency may be generated at any given time, e.g., in a manner similar to a digital to analog converter in the THz frequency range. Digital signal processing algorithms may be used by the controller to monitor and automatically the lights. Thus, the controller may actively adjust the spectrum; detect a spectrum incident on the plant canopy from different wavelengths; detect the fluorescence in the reflection of the plant canopy, e.g., when excited by 285 nm UV-B LED, that indicates peak photosynthesis; and/or significantly reduce the amount of energy required for peak plant yield. Energy used to drive indoor urban agriculture lighting can be the most expensive operating cost for the farmer. By using quantum generated LED colors to produce the exact amount of light that a plant needs, a user may save the amount of required to grow cultivars and also avoids generating heat from exciting phosphorus with 460 nm blue LEDs in order to generate white light. The controller may increase a bandwidth of the light that effects plant growth, e.g., from PAR 400-700 nm to 285-760 cm to include UV and far red light. The controller may be programmed (e.g., via memory and at least one processor) to vary the wavelength and/or intensity of light over time. In some aspects, the light control may vary in a cycle over a day. Additionally, and/or alternatively, the controller may vary the wavelength and/or intensity according to a program over a life cycle of a plant. The controller may provide a different wavelength and intensity at a beginning of a life cycle of a plant in comparison to a later period of the life cycle. In some aspects, the controller may include a sensor, or may receive user input, that indicates a person is in the area. The controller may automatically stop or reduce one or more wavelengths of light to protect the person. For example, a maintenance or operator cycle may be programmed for the controller, which when triggered, causes the controller to cut off UV wavelengths and to provide a green wavelength that does not disturb plants or people. For example, green may be acceptable for presence of a person without affecting the grow cycle of the plant. In some aspects, the trigger may be a user input, e.g., either remotely or at a keypad at the outside door of the housing. In other aspects, the trigger may be a sensor that senses a door opening or movement inside the housing, a camera that identifies the presence of a person, or other types of sensors that indicate a presence of a person. The safety cycle can allow an operator or maintenance person to enter the housing during a light cycle, e.g., at time of which the lights may be programmed to output UV light to avoid any potential harmful effects to the skin of the person.

The controller may also control the pump operation and fluid flow within the system. A pump may continuously pump fluid from a pump pan to an upper hydroponics pan. In other examples, the pump may operate in a periodic manner. The controller may comprise a timer that controls operation of the pump, e.g., including a length of time during which the pump stops pumping fluid and a length of time during which the pump circulates the fluid.

The controller may enable a user to remotely control the hydroponics system. For example, a measurement/signal from any of the example sensors may be provided to a user at a remote location. The remote user may receive temperature, pH, air quality, etc. measurements and/or may receive video or images of the hydroponics system. For example, the remote user may receive infrared video and/or non-infrared video that enables the user to determine adjustments to make to the light source(s), pump, and or air circulation system. The controller may also receive instructions from the remote user and to adjust the light source, pump, and/or air circulation system accordingly. This enables a farmer to tend to the crop remotely, even from a mobile device. This may enable the farmer to avoid the need for manual labor for watering, HVAC control, nutrients, raising and lowering lights, and/or security.

Figure 3A:
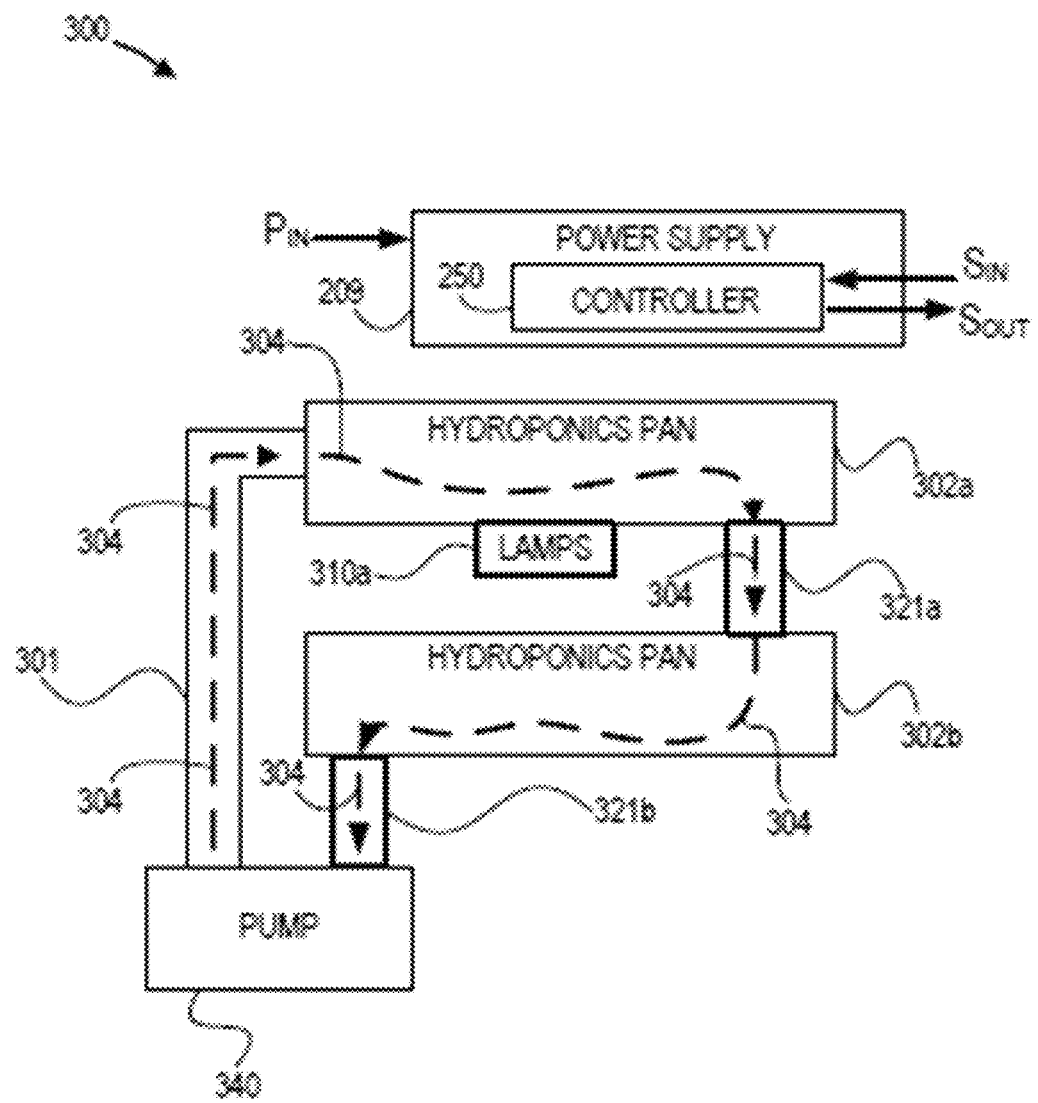
FIG. 3A illustrates a system diagram of a hydroponics system according to aspects of the present application.
Figure 3B:
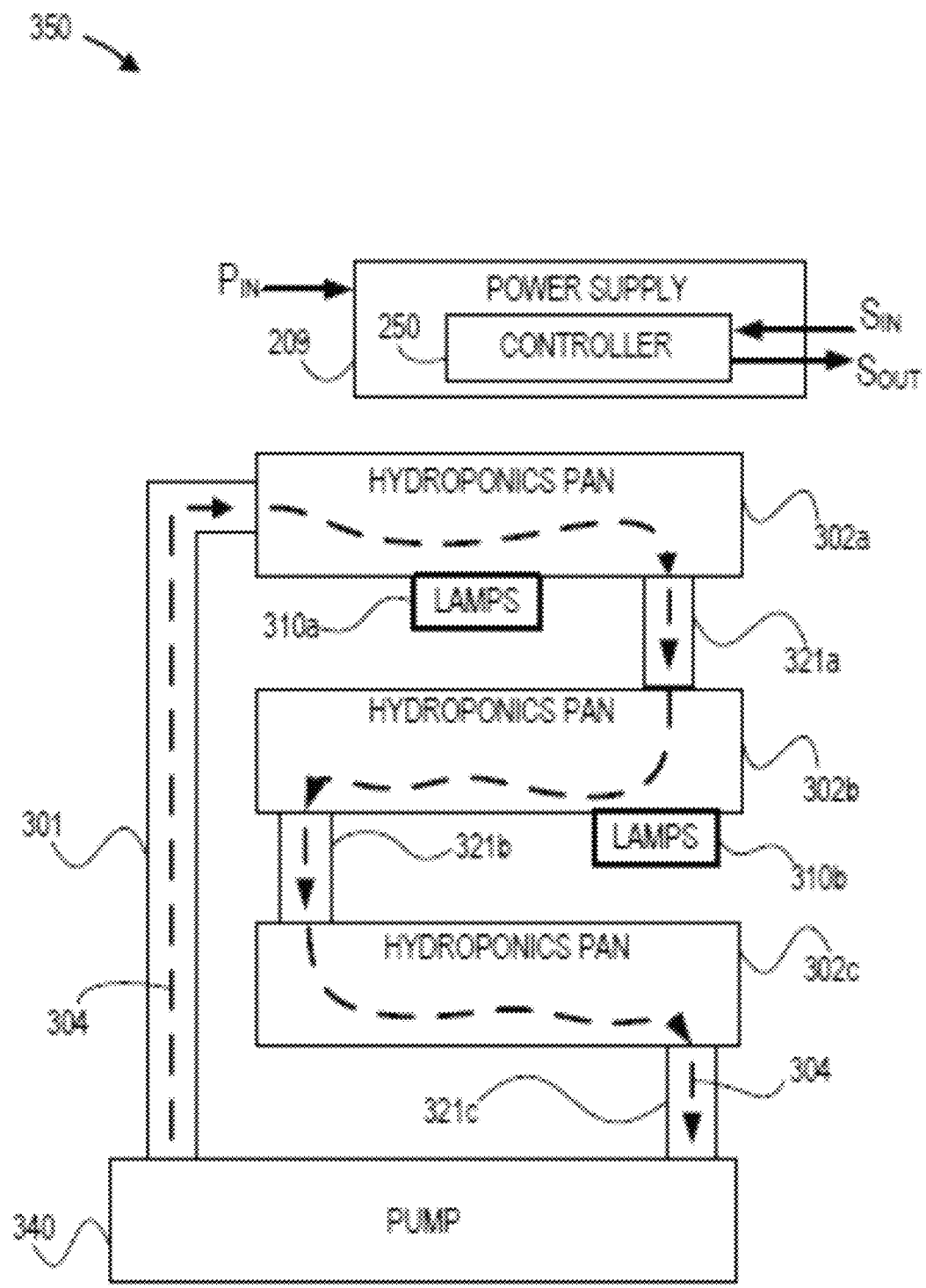
FIG. 3B illustrates a system diagram of a hydroponics system according to other aspects of the present application.

According to the teachings herein, the hydroponics pans 202a-c and tubes 221a-c may be arranged for series fluid flow within the hydroponics system 200, e.g., for fluid to flow across a pan before flowing into the next pan and so forth in a pattern. FIG. 2 illustrates the direction of water flow using arrows with a dashed line. Series fluid flow may advantageously enhance the transfer of heat from heat producing elements (e.g., the light sources 210a-c and/or power supplies 209) to the grow solution 204. Grow solution 204 or other fluid may be pumped to hydroponics pan 202a via an intake port 220, e.g., as illustrated in FIGS. 3A, 3B. The solution 204 may then circulate within the hydroponics pan 202a to transfer heat from the light source 210a to the grow solution 204. The grow solution 204 may then drain (i.e., flow) out of hydroponics pan 202a via the tube 221a into hydroponics pan 202b.

The solution 204 may further circulate within the hydroponics pan 202b to transfer heat from the light source 210b to the grow solution 204. Additionally, plants (e.g., microgreens) within the hydroponics pan 202b may receive the grow solution 204 and may also receive light from the light source 210a. The grow solution 204 may then drain (i.e., flow) out of hydroponics pan 202b via the tube 221b into hydroponics pan 202c.

The series flow may continue to hydroponics pan 202c in a similar manner whereby the hydroponics pan 202c receives the grow solution 204 for circulation and for transferring heat from light source 210c. According to the teachings herein, the tubes 221a-c may be arranged and separated to promote fluid circulation within the hydroponics pans 202a-c. For instance, tube 221c may be placed at an opposite end of hydroponics pan 221c from tube 221b. In this way fluid (e.g., grow solution 204) flows in series entering the hydroponics pan 202c near one side via tube 221b and draining near an opposite side via tube 221c. This may advantageously reduce stagnation of grow solution 204 and enhance heat conduction and hydroponics system performance.

FIG. 3A illustrates a system diagram of a hydroponics system 300 according to an example. The hydroponics system 300 has the power supply 209, hydroponics pans 302a-b, light source 310a (e.g., lamps and/or LEDs), pump 340, a tube 301 (i.e., an outflow tube), and tubes 321a-b. The system diagram shows a series flow (i.e., series fluid flow) arrangement of the hydroponics pans 302a-b with tubes 304a-b for circulating and providing solution 304.

As illustrated with a dash flow pattern, the solution 304 may be pumped from pump 340 through tube 301 (i.e., an outflow tube) to hydroponics pan 302a. Tube 321a may be placed so that it is separated from tube 301 (e.g., at an opposite end of hydroponics pan 302a). In this way the solution 304 may circulate in the hydroponics pan 302a to conduct heat from lamps 310a prior to draining via tube 321a to hydroponics pan 302b. The hydroponics pans may be positioned at an angle or may be positioned in a flat manner. The hydroponics pans may be configured to provide a thin sheet of hydroponic solution directly to media such as cocoa weave mat, e.g., using a titled position. In other examples, Styrofoam floating trays may be used, which may require flat plans with a 1.5" solution level. In another example, a variable height of solution from 0.5" to 1.5" in flat pan may be provided with an ebb flow pump that is periodically pulsed. As one example, the pump may be pulsed to operate for 30 minutes every 12 hours before turning off. These aspects may help to raise a cocoa weave media to a desired level. Tube 321b may be placed so that it is separated from tube 321a, and in this way the solution 304 may circulate in the hydroponics pan 302b to plants (e.g., microgreens) prior to draining via tube 321b to the pump. The pump 340 completes the series path of solution 304 to return the solution 304 to tube 301.

Using a series flow arrangement may advantageously enhance heat transfer by integrating the hydroponics pans 302a-302b as part of the flow path. Additionally, unlike other flow arrangements (e.g., parallel flow arrangements), series flow may avail a hydroponics system with fewer components (e.g., tubes) to occupy less space.

As shown in FIG. 3A the power supply may receive power input $S_{IN}$. As described above, power input PIN may be alternating current (ac) power and/or direct current (dc) power which may, in turn, be converted for driving electrical components of the hydroponics system 300. Also, the controller 250 may receive signals $S_{IN}$ (e.g., hydroponics system variables) indicative of the hydroponics system environment (e.g., a temperature of the solution 304). In response to receiving signals, the controller may provide a signal vector $S_{OUT}$ comprising one or more signals for regulating system parameters. For instance, the signal vector $S_{OUT}$ may be provided to the light source 310a to control light intensity.

FIG. 3B illustrates a system diagram of a hydroponics system 350 according to another example. Hydroponics system 350 is similar to hydroponics system 300 except it includes hydroponics pan 302c and tube 321c to increase the number of hydroponics pans used in a series flow arrangement. In the series flow arrangement shown in FIG. 3B, solution 304 may circulate in hydroponics pan 302b to plants (e.g., microgreens) while absorbing heat from the light source 310b. Solution 304 may drain via tube 321b to hydroponics pan 302c where the solution 304 circulates to additional plants prior to draining via tube 321c to the pump 340. The pump 340 again completes the series path of solution 304 pumping it through tube 301.

Figure 4A:
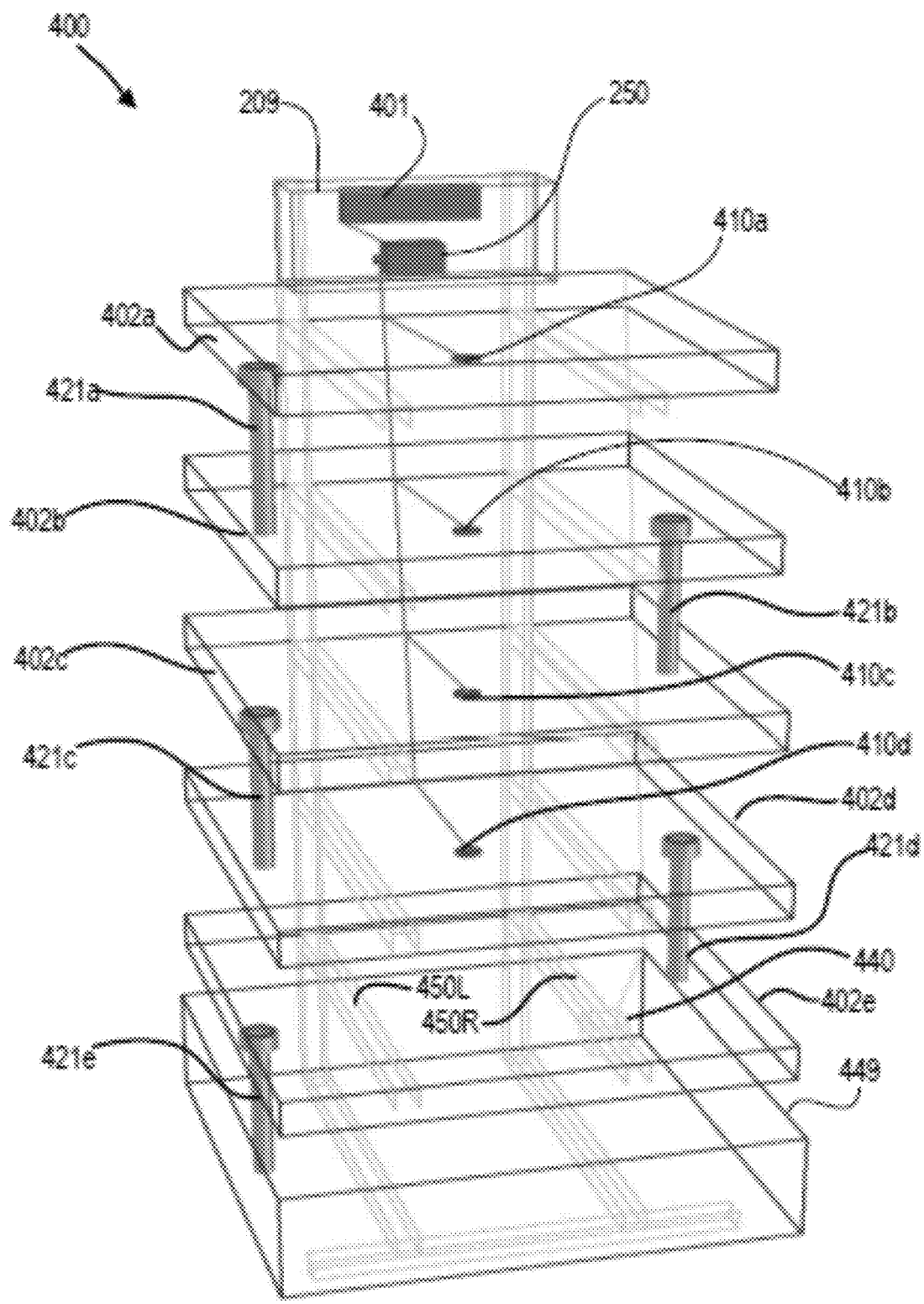
FIG. 4A illustrates a side perspective view of a hydroponics system according to aspects of the present application.

FIG. 4A illustrates a side perspective view of a hydroponics system 400 according to an example. Hydroponics system 400 includes the power supply 209, hydroponics pans 402a-e, light sources 410a-d (e.g., LEDs), a pump pan 449, a pump 440, and tubes 421a-e arranged for series flow of a solution (e.g., a grow solution), as described in connection with FIGS. 2-3B. The power supply 209 includes an ac converter 401 which may be electrically coupled with converter 250. As illustrated the converter 250 may be electrically coupled with the light sources 410*a-d*; and the light sources 410*a-d* may be in thermal contact with hydroponics pans 402*a-d*, respectively. In some aspects, electrical coupling with the light sources 410*a-d* may also avail two way transmission of signals $S_{IN}$ and signal vector $S_{OUT}$ to and from controller 250. Additionally, the controller 250 may be implemented using off the shelf components including a Raspberry Pi™ of Raspberry Pi Foundation.

Also, as illustrated, the hydroponics system 400 may be attached with a frame. The frame may comprise a main frame body multiple sets of supports that extend outward from the main frame body and are configured to receive and hold a pan. For example, the multiple sets of supports may each extend from the main frame in a parallel manner with a spacing that enables, e.g., a 32 inch spacing between adjacent frames. This may enable the frames to be mounted to wall studs having a 16 inch spacing. For instance, hydroponics pan 402*e* may be supported by frame components 450L, 450R; and the pump 440 may connect with a hydroponics pan 449 (i.e., a bottom pan that receives and collects the fluid that has flowed through each of the pans 402*a-e*, e.g., for recirculation). The frame components may have adjustable heights, e.g., along a central frame. FIG. 4A illustrates the central frame as a set of channels to which adjustable shelf brackets may be removably coupled. The central frame may be fastened to a wall. Series flow can be similar to that described in the preceding description of FIGS. 2-3B, except the pump 440 may receive grow solution (e.g., solution 204) via hydroponics pan 449.

Figure 4B:
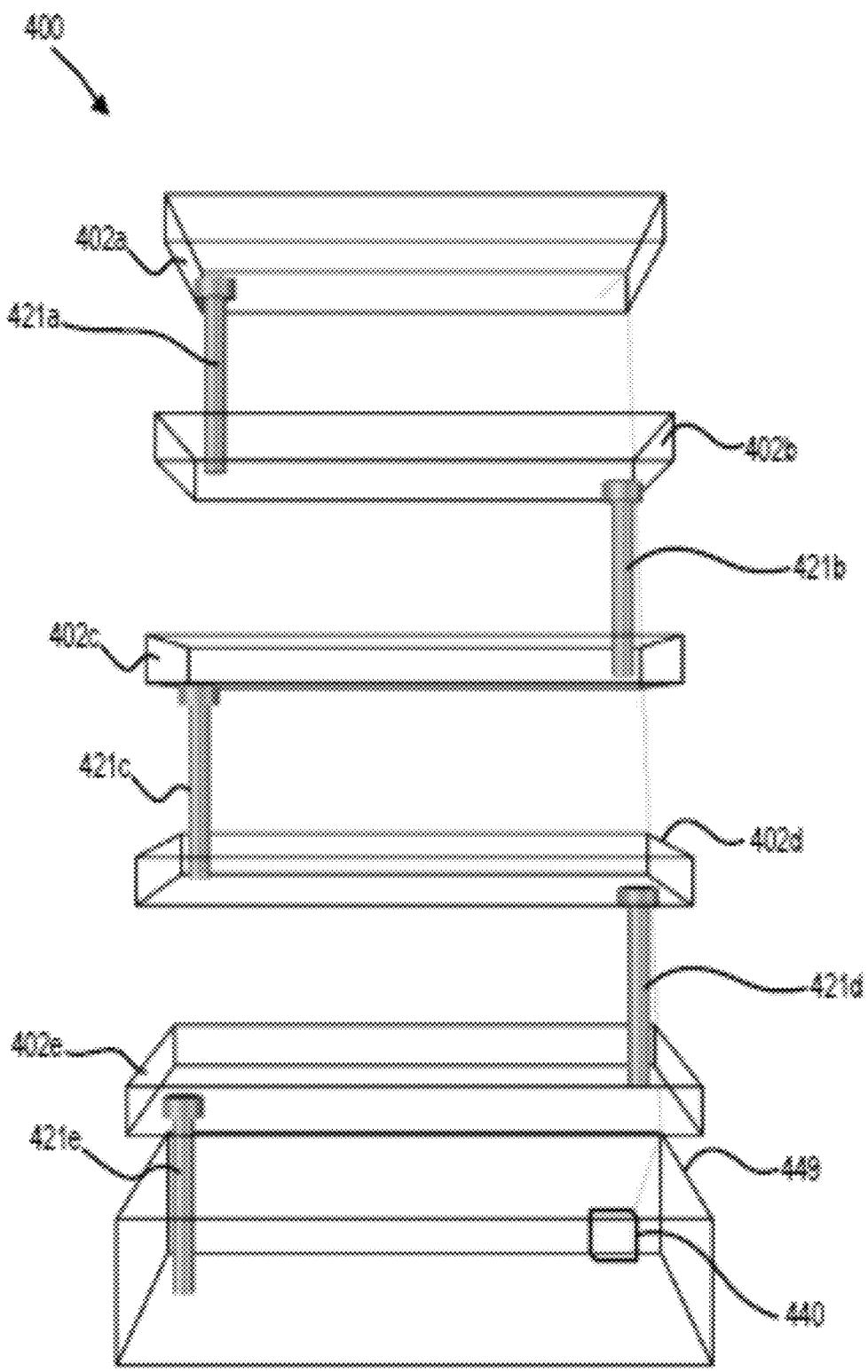
FIG. 4B illustrates a front perspective view of the hydroponics system according to the example of FIG. 4A.

FIG. 4B illustrates a front perspective view of the hydroponics system 400 according to the example of FIG. 4A. The front perspective view illustrates the series flow arrangement of hydroponics pans 402*a-e* with tubes 421*a-e* and pump 440. As illustrated the pump 440 may pump grow solution (e.g., solution 204) to hydroponics pan 402*a* (i.e., a top pan) where it circulates, and therefore absorbs heat from light source 410*a* as it moves along the body of the pan, and drains via tube 421*a* to hydroponics pan 402*b*. Grow solution may continue in a series path through each subsequent hydroponics pan (i.e., hydroponics pans 402*b-e*) and tube (i.e., tubes 421*b-e*) until it reaches hydroponics pan 449 (i.e., a bottom pan). Pump 440 may be coupled with hydroponics pan 449 to receive grow solution (e.g., solution 204), thereby completing the series flow arrangement.

Figure 6:
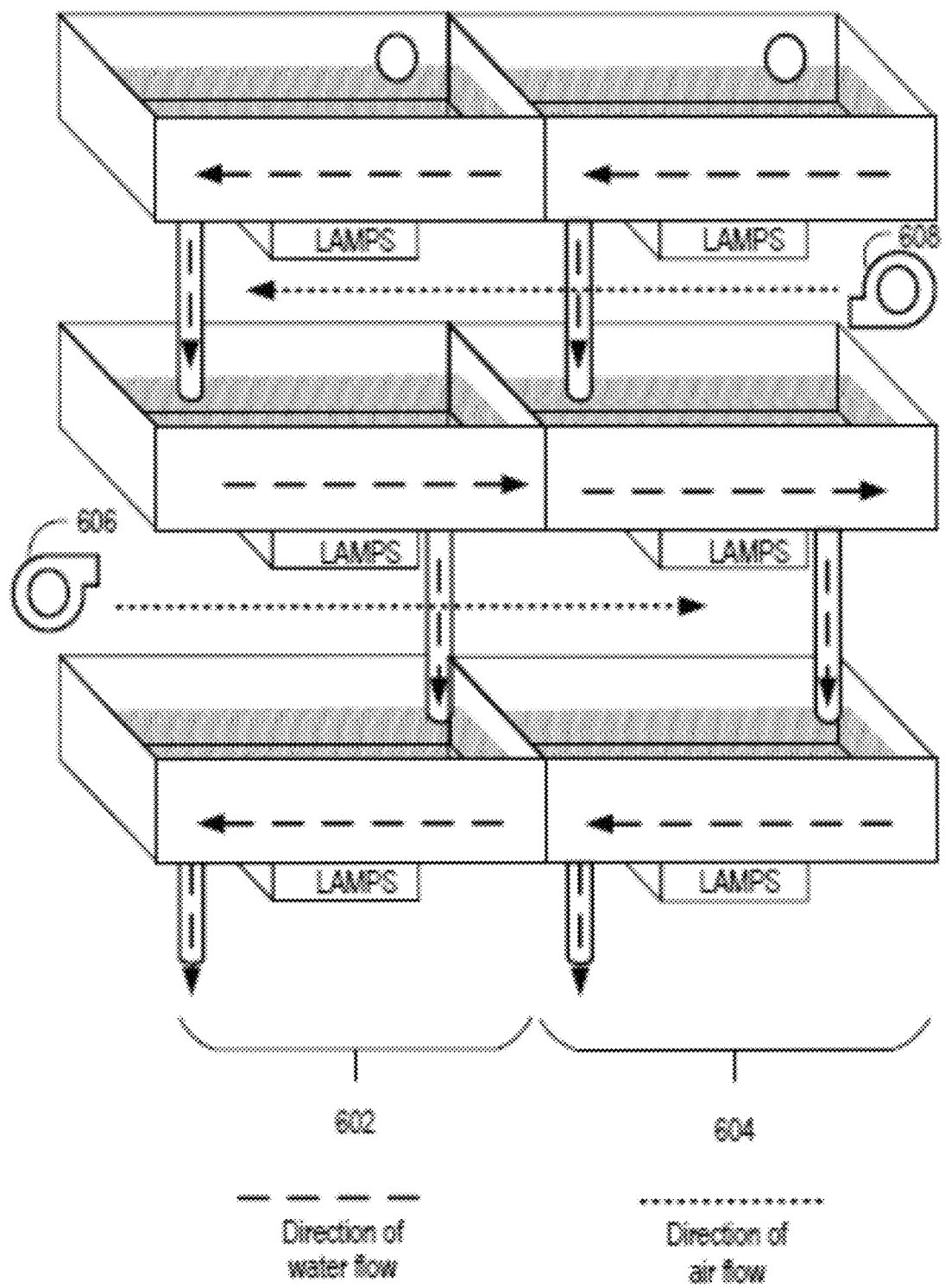
FIG. 6 illustrates an example of adjacent sets of hydroponic pans according to the teachings herein.
Figure 11:
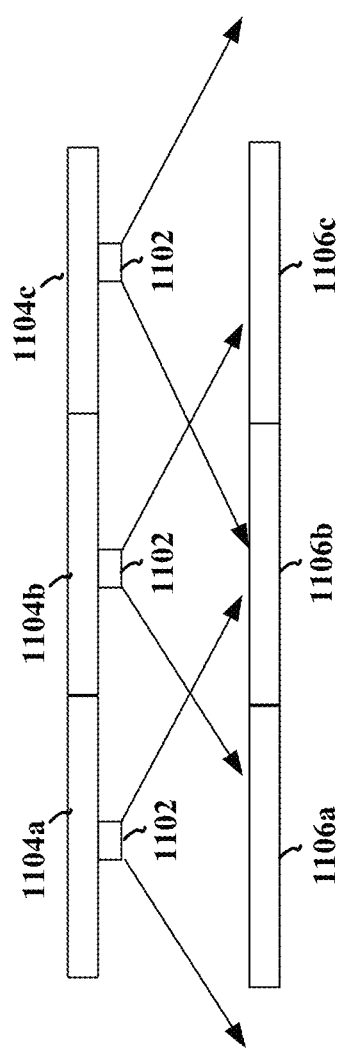
FIG. 11 illustrates an example pattern of light placement to provide overlapping light coverage.

As well, the hydroponics pans are configured such that multiple sets of stacked hydroponics pans can be positioned together to form a hydroponics system of any desired length, as illustrated in FIG. 6. While FIG. 6 only illustrates a first set of hydroponics pans 602 and a second set of hydroponics pans 604, any number of sets of hydroponics pans may be placed adjacent to each other. As well, while only three stacked hydroponics pans are illustrated in each set 602, 604, any number of hydroponics pans can be stacked in each set, e.g., according to a size constraint of a room or building. The hydroponics pans may be positioned such that the adjacent hydroponics pans have a small gap between each other, e.g., less than 3 inches or even less than 1 inch. In other examples, the hydroponics pans may contact each other. The placement of multiple sets of hydroponics pans together may provide a number of benefits. First, light from a light source in one hydroponics pan of a first set of hydroponics pans 602 may shine into a portion of an adjacent hydroponics pan of a second set of hydroponics pans 604. This allows the light to be used by cultivars growing in the adjacent hydroponics pan rather than being wasted. The linear array design enables lights from adjacent systems (e.g., adjacent stacks of pans, to couple to provide continuous light across the array. FIG. 11 illustrates an additional view 1100 showing lights 1102 positioned on the bottom of a set of adjacent upper pan 1104*a*, 1104*b*, 1104*c* with spacing to provide overlapping coverage to the pans below, e.g., 1106*a*, 1106*b*, 1106*c*. The arrows extending from each light 1102 show the coverage area for that light. The overlapping lines show that placement of the lights so that the light overlaps at the edges of the pans enables a more consistent amount of light to be provided across the hydroponics pans. Although the light from an individual light sources 1102 may be stronger at the center of the pan, by spacing the lights so that the edges of the hydroponics pan receives overlapping light enables the edges to receive a level of light more similar to the middle area underneath an individual light source.

Figure 7:
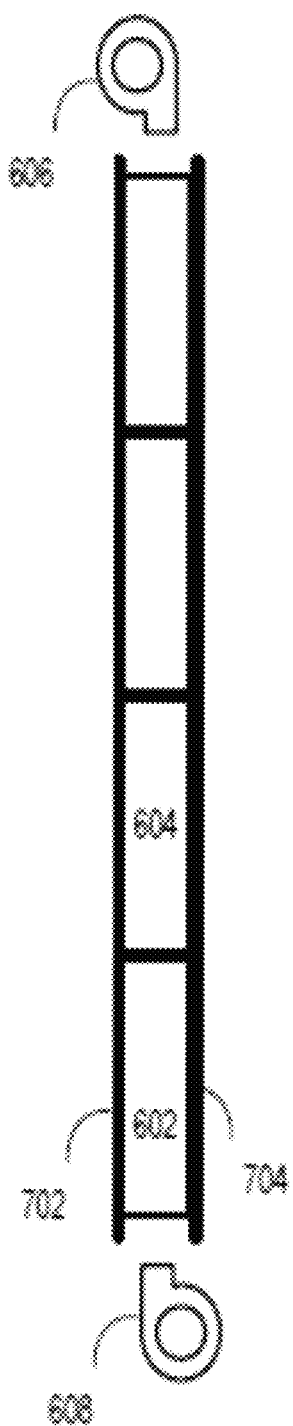
FIG. 7 illustrates an example of a row of adjacent sets of hydroponic pans according to the teachings herein.

As well, each row of adjacent hydroponics pans in a combined system having multiple sets, e.g., columns, of hydroponics pans may form an air flow path. FIG. 6 illustrates a first fan 606 blowing air in a first direction over a row of adjacent hydroponics pans and a second fan 608 blowing air in the opposite direction over the next row of adjacent hydroponics pans. This pattern of air flow may be repeated for any number of rows of adjacent hydroponics pans. Thus, the air flow may follow a serpentine pattern similar to the flow of fluid within the pans. The air flow and the fluid flow may be in the same direction or in opposite directions. The rectangular shape of the hydroponics pans also may it possible to place a barrier, a wall, a layer of plastic, etc. against sides of the hydroponics pans. For example, a first side of the sets of adjacent hydroponics pans may be positioned near and/or fastened to a wall. A sheet of plastic may be positioned against the opposite side of the sets of adjacent hydroponics pans. Alternately, the sets of adjacent hydroponics pans may be positioned on a free standing shelf/frame and sheets of plastic may be positioned on either side of the adjacent sets of hydroponics pans. Thus, each row of adjacent hydroponics pans may form a channel for air flow. FIG. 7 illustrates a top view of multiple sets of adjacent hydroponics pans, e.g., 602, 604, . . . from FIG. 6, have a first wall 702 and a second wall 704 place on opposite sides. The walls may be permanent walls or may be temporary layers, such as a plastic sheet. A fan 606, 608 may be positioned for each row of adjacent hydroponics pans, as illustrated in the side view of FIG. 6. Thus, the structure of the sets of hydroponics pans enables clean areas, or clean rooms to be established around cultivars to avoid contamination, the spread of disease, etc. The modular aspects described herein provide a redundant array of independent systems, which can reduce pressures to the combined system (e.g., of multiple arrays of stacked hydroponics pans) due to diseases or pests.

Figure 5:
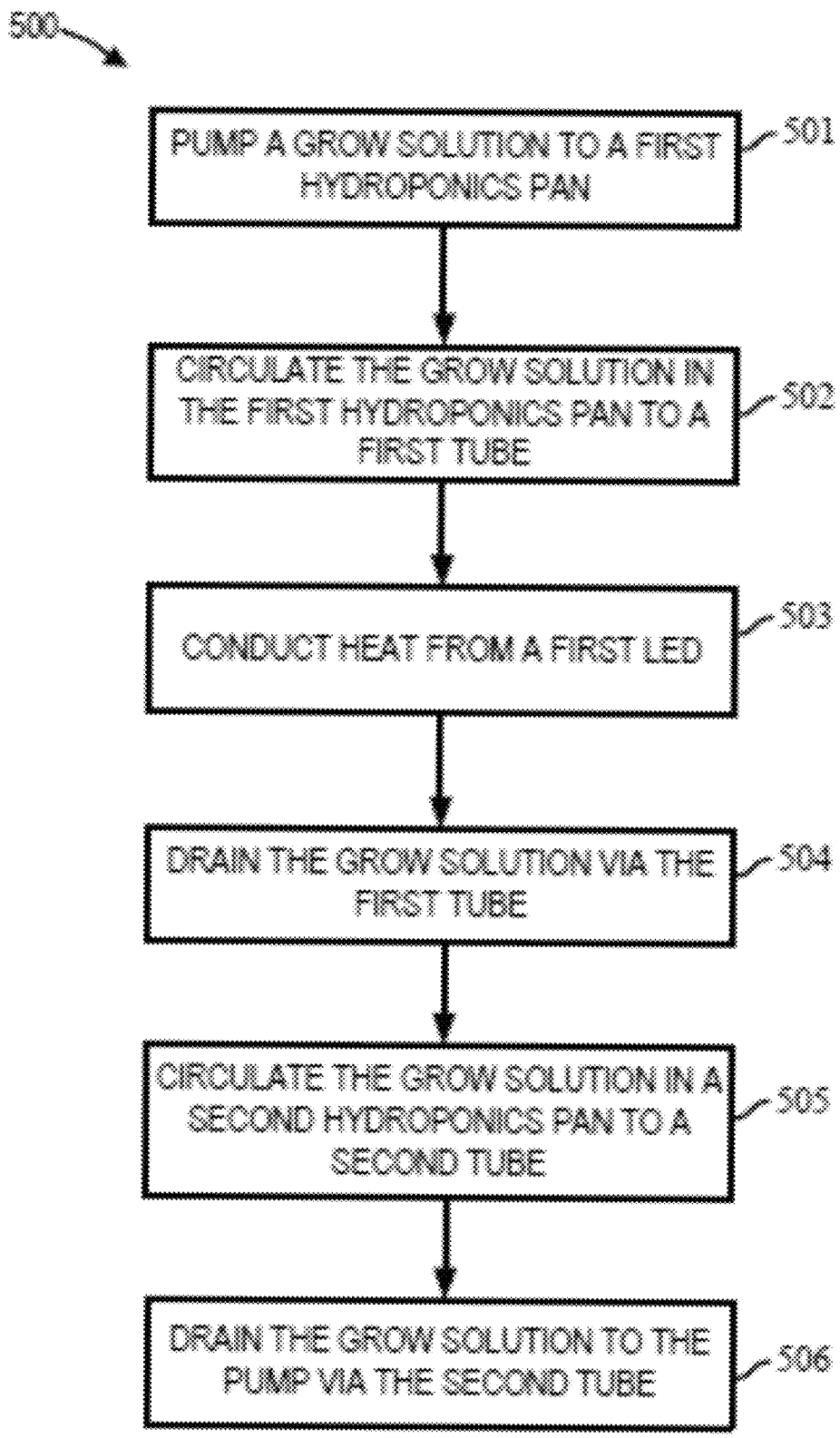
FIG. 5 illustrates a conceptual flow diagram of operating a hydroponics system according to the teachings herein.

FIG. 5 illustrates a conceptual flow diagram 500 of operating a hydroponics system according to the teachings herein. Operation for series flow may begin with step 501 to pump a grow solution (e.g., solution 304) to a first hydroponics pan (e.g., hydroponics pan 302*a* and hydroponics pan 402*a*). Step 502 may refer to circulating the grow solution in the first hydroponics pan and then to a first tube (e.g., tube 321*a* and tube 421*a*). Step 503 may refer to conducting (i.e., transferring) heat from a first LED (e.g., light source 310*a* and light source 410*a*) to the grow solution. Step 504 may refer to draining the grow solution via the first tube. Step 505 may then refer to circulating the grow solution in a second hydroponics pan (e.g., hydroponics pan 302*c* and hydroponics pan 402*e*) and then to a second tube (e.g., tube 321*c* and tube 421*e*). Step 506 may then refer to the series flow procedure of draining the grow solution to the pump (e.g., pump 340, 440) via the second tube.

Additionally, the circulation of the solution may advantageously allow the solution in the first and second hydrodynamic pans to share dissipated heat. According to the teachings herein, by sharing dissipated heat temperature can be reduced and/or controlled among hydrodynamics pans.

Figure 10C:
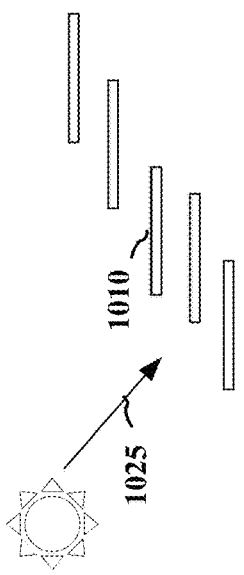
FIG. 10C illustrates an example of a staggered placement for hydroponics pans.
Figure 10B:
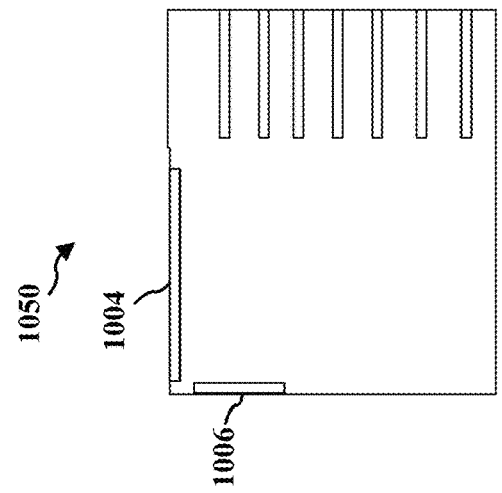
FIG. 10A and FIG. 10B illustrate a example of a hydroponics system including a housing with openable windows for natural lighting and collection of solar power for control of artificial lights.
Figure 10A:
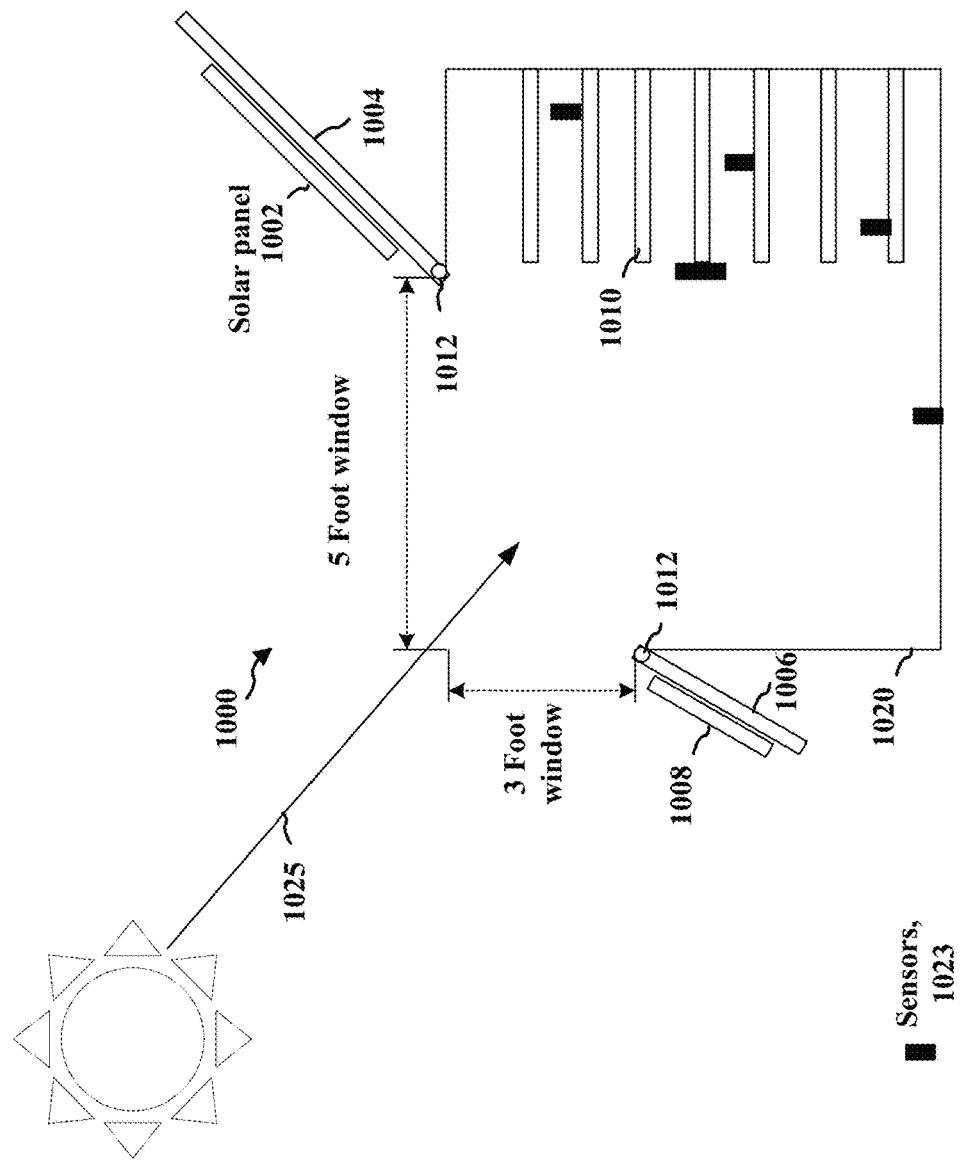

FIGS. 10A and 10B illustrate views of an example housing 1020 that includes walls and a ceiling surrounding a set of stacked hydroponics pans 1010. The number of pans in a stack may vary according to the height of the housing and the height of the plants being grown. The number shown is merely an example to illustrate the concept. The stacked pans may be attached to or positioned against a wall of the housing, and multiple arrays of stacked pans may be provide within the housing. The housing 1020 may further include a floor beneath the pans, e.g., as shown in FIGS. 10A and 10B. FIG. 10A illustrates a cross section view 1020 of the housing and shows that portions of the ceiling (e.g., 1004) and/or walls (e.g., 1006) may fold open, retract, or otherwise move to allow sunlight 1025 to light the area of the hydroponics pans (e.g., in the interior of the housing 1020). In some aspects, a hinge 1012 may be provided that allows the portions of the housing to rotate away to allow the sunlight to enter the window areas. The windows may include a translucent material such as glass or plastic, or may be openings. The portions 1004 and/or 1006 may be manually opened and closed. In other aspects, the openings may be opened and closed via an electronic controller, e.g., which may allow remote control by a user or may be opened and/or closed according to a program. The openings allow for more efficient use of natural light, while also providing protection during storms, when they can be closed. The housing may be a metal material such as steel, in some examples. Solar panels 1008 and 1002 may be fixed to the portions 1004 and 1006, and may be angled to receive the sunlight when the portions 1004 and 1006 are opened. This allows solar energy to be collected. The position of the portions 1004 and 1006 may be adjustable, e.g., to better face the sun. The positions may be manually or automatically controlled to track the sun. The solar energy may be used to power the artificial lights during the night or during dimmer natural light conditions. The solar energy may be used to power the controller, a fan system, an operating program, etc. FIG. 10A illustrates that one or more sensors 1023 may be positioned inside the housing to provide feedback for controlling the lights for the plants, e.g., as described in connection with FIGS. 8 and 9, for example. The controller described in connection with FIGS. 2, 8, and/or 9, may provide adaptive lighting that automatically supplements the natural sunlight to provide an 18 hour per day cycle even when there is limited or no sunlight for portions of that time. A sensor may detect the current lighting conditions and automatically adjust the output to one or more of the wavelengths of light to generate the desired lighting conditions. FIG. 10B illustrates a view 1050 in which the portions 1004 and 1006 of the housing 1020 have been closed to provide an enclosed housing. Although not illustrated, each pan in the stack of hydroponics pans may include a light attached to the bottom, e.g., as described in connection with at least FIGS. 1-7. FIG. 10C illustrates an example in which the pans may be stacked in a staggered position, e.g., within the housing 1020, to allow for better sunlight coverage, and each pan may include one or more lights attached to the bottom of the pans. The housing may be an enclosed cargo container or a room of a building.

Figure 12:
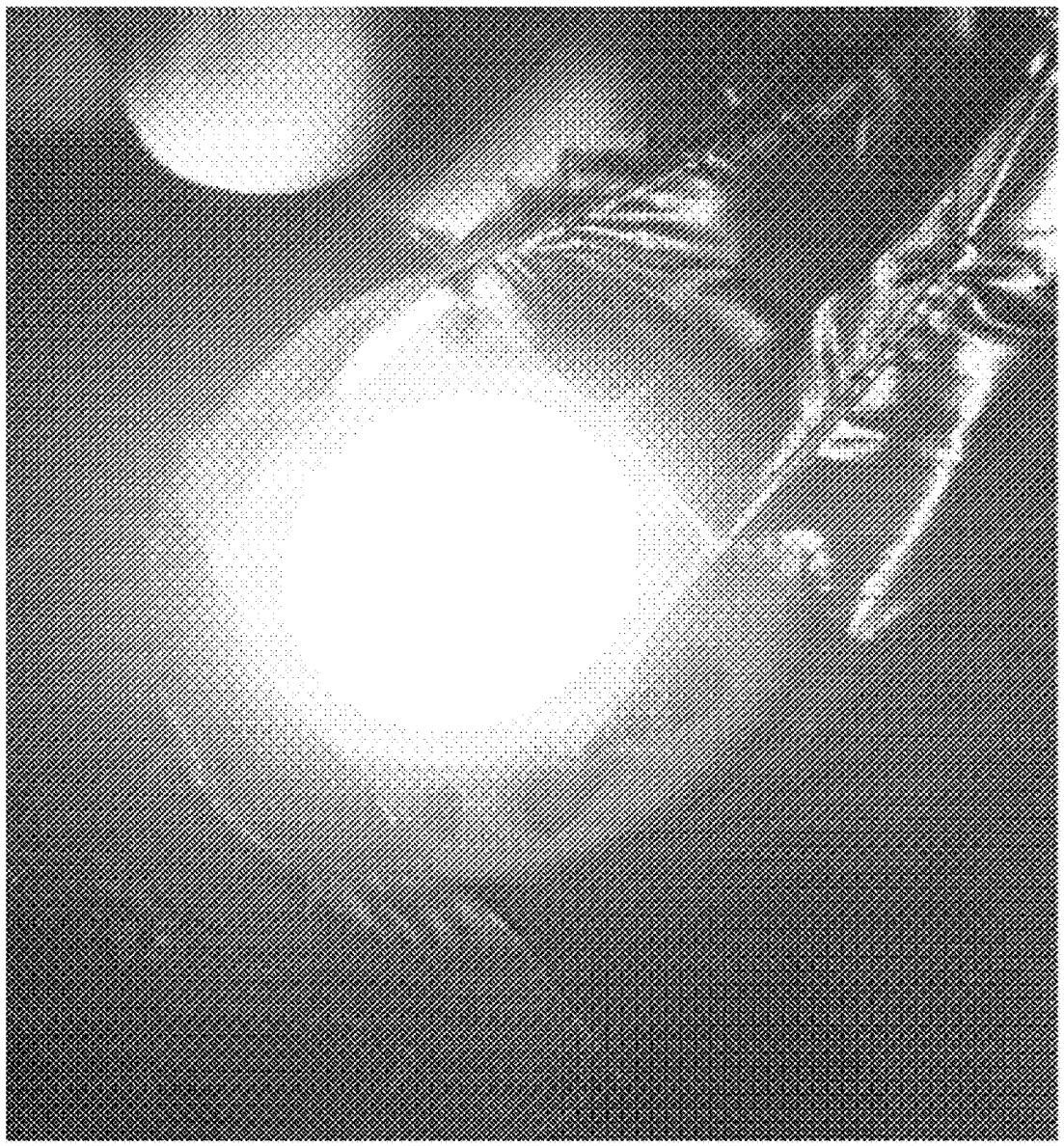
FIG. 12 illustrates an example of a thermal coupling of an LED light to a bottom of a hydroponics pan.

FIG. 12 illustrates an example of an LED light that is thermally coupled to the bottom of a hydroponic pan using a thermal adhesive and thermal tape.

Although the teachings herein have been described in terms of certain examples, other examples that are apparent to those of ordinary skill in the art, including examples that do not provide all of the features and advantages set forth herein, are also within the scope of this invention. Moreover, the various examples described above and within the appendix can be combined to provide further examples. In addition, certain features shown in the context of one example can be incorporated into other examples as well.

The previous description is provided to enable any person skilled in the art to practice the various aspects described herein. Various modifications to these example aspects presented throughout this disclosure will be readily apparent to those skilled in the art, and the concepts disclosed herein may be applied to other techniques for transferring heat from grow lamps and heat producing elements within a hydroponics system. Thus, the claims are not intended to be limited to the examples presented throughout the disclosure, but are to be accorded the full scope consistent with the language claims. All structural and functional equivalents to the elements of the example aspects described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), or analogous law in applicable jurisdictions, unless the element is expressly recited using the phrase "means for" or, in the case of a method claim, the element is recited using the phrase "step for."

What is claimed is:

1. A hydroponics lighting system, comprising:
    a plurality of hydroponics pans;
    multiple light sources, each of the multiple light sources being attached to an exterior surface of at least one of the plurality of hydroponics pans and individual light sources emitting different wavelengths of light;
    one or more sensors positioned to measure a spectrum of an incident light on a plant canopy level from a combination of the different wavelengths of light emitted from the multiple light sources; and
    a controller configured to individually adjust one or more of a light intensity output or a wavelength output for each of the multiple light sources over time to maintain a target combination of wavelengths at a target level measured at the plant canopy level by the one or more sensors, wherein one or more of the target combination of wavelengths and the target level varies according to a lifecycle of a corresponding plant.

2. The hydroponics lighting system of claim 1, further comprising:
    a power supply comprising the controller, wherein the controller is further configured to adjust the wavelength output and the light intensity output for each of the multiple light sources based on Fourier transform algorithm to maintain a light measurement, obtained from the incident light at the plant canopy level, at the target combination of wavelengths and at the target level.

3. The hydroponics lighting system of claim 1, wherein the controller comprises an LED driver.

4. The hydroponics lighting system of claim 1, wherein the one or more sensors include a quantum light meter, and wherein the controller is configured to control an LED photon efficiency to maintain a measurement of the incident light at the plant canopy level at the target combination of wavelengths and at the target level.

5. The hydroponics lighting system of claim 1, wherein the controller is configured to adjust at least one of a photosynthetic photon flux density (PPFD) and an LED current to achieve a programmed wavelength and programmed intensity.

6. The hydroponics lighting system of claim 1, wherein the controller is attached to the exterior surface of a water cooled hydroponics pan and having thermal contact with a heat conductive material at a level with a grow solution inside the water cooled hydroponics pan.

7. The hydroponics lighting system of claim 1, wherein the controller is configured to separately control a light intensity for a subset of one or more of the multiple light sources.

8. The hydroponics lighting system of claim 1, wherein the controller is configured to separately control the light intensity output and the wavelength output with respect to time for a subset of one or more of the multiple light sources.

9. The hydroponics lighting system of claim 1, wherein the controller uses a digital signal processing algorithm to individually adjust the one or more of the light intensity output or the wavelength output based on measurements of the one or more sensors to maintain a measurement of the incident light at the plant canopy level at the target combination of wavelengths and at the target level.

10. The hydroponics lighting system of claim 1, wherein each of the multiple light sources comprises a quantum generated light emitting diode (LED), and the controller is configured to adjust individual quantum generated LED wavelengths to form the target combination of wavelengths.

11. The hydroponics lighting system of claim 10, wherein the target combination of wavelengths includes an ultraviolet wavelength of 285 nm and below a lower limit of 400 nm for photosynthetic active radiation (PAR).

12. The hydroponics lighting system of claim 10, wherein the target combination of wavelengths includes a far red wavelength of 760 nm and above an upper limit of 700 nm for photosynthetic active radiation (PAR).

13. The hydroponics lighting system of claim 1, wherein the controller is configured to:
individually measure parameters for the different wavelengths of light; and
individually control one or more of the light intensity output or the wavelength output for each of the multiple light sources to maintain a measurement of the incident light at a sensor at the plant canopy level at the target combination of wavelengths and at the target level.

14. The hydroponics lighting system of claim 13, comprising multiple power supplies with different power supplies for the different wavelengths of light, wherein the controller is configured to use closed loop feedback from a corresponding sensor to adjust a constant current power supply for the individual light sources for the different wavelengths of light to maintain the measurement of the incident light at the plant canopy level at the target combination of wavelengths and at the target level.

15. The hydroponics lighting system of claim 14, wherein the controller is configured to independently control each of the multiple power supplies for independent control over an intensity of the different wavelengths of light.

16. The hydroponics lighting system of claim 14, further comprising: a potentiometer configured to vary an intensity of the different wavelengths of light.

17. The hydroponics lighting system of claim 1 further comprising:
a housing having an openable portion in at least one of a ceiling or a wall, wherein when opened, the housing includes light passing windows that enable sunlight to enter the housing.

18. The hydroponics lighting system of claim 17, further comprising:
a solar panel positioned on an interior side of the openable portion in a closed position and exterior to the housing when the openable portion is in an opened position.

19. The hydroponics lighting system of claim 1, further comprising:
memory and at least one processor coupled to the memory, and configured based at least in part on information stored in the memory, to:
control, via the controller, light output to stop output of ultraviolet light in response to a trigger that indicates a presence of a person; and
provide, in response to the trigger, additional light output in a wavelength that does not disturb a growth cycle of the corresponding plant.

20. The hydroponics lighting system of claim 1, each of the multiple light sources comprises a quantum generated light emitting diode (LED), wherein the one or more sensors include a quantum light meter, and wherein the controller is configured to control quantum generated photons from a semiconductor band gap for each individual LED wavelength to maintain a measurement of the incident light at the plant canopy level at the target combination of wavelengths and at the target level based on a Fourier transform algorithm.

* * * * *